United States Patent [19]

Frisque

[11] 3,989,633
[45] Nov. 2, 1976

[54] WINDSHIELD WASHER FLUIDS CONTAINING FROM 10-1000 PPM OF ACRYLAMIDE POLYMER TO REDUCE WEAR OF WIPER BLADES AND REDUCE WINDAGE LOSSES OF FLUID

[75] Inventor: Alvin J. Frisque, La Grange, Ill.

[73] Assignee: Nalco Chemical Company, Oak Brook, Ill.

[22] Filed: June 11, 1975

[21] Appl. No.: 586,004

Related U.S. Application Data

[63] Continuation-in-part of Ser. No. 527,663, Nov. 27, 1974, abandoned.

[52] U.S. Cl. .................................... 252/11; 252/79; 252/170; 252/DIG. 2; 252/DIG. 10; 260/29.6 HN; 260/33.4 R
[51] Int. Cl.² ..................... B08B 3/00; C09K 3/18
[58] Field of Search ................. 260/29.6 H, 33.4 R; 252/DIG. 2, DIG. 10

[56] References Cited
UNITED STATES PATENTS

| 3,152,352 | 10/1964 | Kosik, Jr. | 15/539 |
| 3,245,912 | 4/1966 | White | 252/70 |
| 3,360,356 | 12/1967 | Nortich | 71/65 |
| 3,696,042 | 10/1972 | Wright | 252/DIG. 10 |
| 3,705,854 | 12/1972 | Gunning | 252/70 |

FOREIGN PATENTS OR APPLICATIONS

| 225,786 | 2/1958 | Australia | 252/DIG. 10 |

Primary Examiner—Donald Levy
Assistant Examiner—Peter F. Kulkosky
Attorney, Agent, or Firm—John G. Premo; Robert A. Miller; Barry W. Sufrin

[57] ABSTRACT

Windshield washer fluids of the type comprising a major portion of water, one or more water-soluble alcohols which are predominantly monohydric alcohols capable of depressing the freezing point of water and a surfactant can be improved in their operational efficiency by adding thereto from between 10–1,000 ppm of an acrylamide polymer having a molecular weight of at least 10,000.

1 Claim, No Drawings

WINDSHIELD WASHER FLUIDS CONTAINING FROM 10-1000 PPM OF ACRYLAMIDE POLYMER TO REDUCE WEAR OF WIPER BLADES AND REDUCE WINDAGE LOSSES OF FLUID

This is a continuation-in-part application of pending Ser. No. 527,663 filed Nov. 27, 1974, of Alvin J. Frisque, and now abandoned.

INTRODUCTION

For many years automobiles and trucks have been equipped with windshield washers. These washers operate by pumping a small jet of an aqueous fluid over the area of the windshield normally contacted by the windshield wipers. The purpose of these fluids is to remove excessive build-up of dirt, snow, slush and other visual impairing contaminants from the windshield to allow the operator of an automobile to have better visibility.

These windshield washer fluids are commonly prepared by adding to water various water-soluble monohydric alcohols, either alone or in combination with certain water-soluble polyhydric alcohols to depress the freezing point of the water sufficiently to allow the fluid to be usable in cold weather. Another ingredient used in conventional windshield washer fluids are small amounts of wetting agents or detergents to improve the cleaning efficiency of the water/alcohol mixtures.

In normal operation windshield washer fluids, when pumped onto the windshield of an automobile from a reservoir, are ejected from small diameter metal or plastic tubing. In normal operation the fluid is ejected in the form of a fine stream which sprays on the center portions of the windshield normally acted upon by the windshield wipers.

When cars are operated at high speeds, it is not uncommon that the wind factors tend to cause the fluid being ejected from the washer mechanism to fan out to a point where much of it does not contact the windshield wiper areas of the windshield. Thus, fluid that could be used to effectively clean and improve the visibility of the windshield for the driver is lost due to such wind factors.

Another problem associated with windshield washer fluids is that when they cleanse away gritty material, it is done so with the operation of the windshield wiper blades. In cleaning the windshield with the wiper blades when the build-up of grit and dirt is high, an undesirable wearing of the rubber windshield wiper blades occurs which tends to greatly diminish their useful life.

If it were possible to provide an additive for windshield washer fluids which would prevent windage losses when they are used during high speed operation of vehicles and which would tend to prevent excessive wear on windshield wiper blades, a substantial improvement in the art would be afforded.

THE INVENTION

Most windshield washer fluids are composed of the following:
1. Water as a major component
2. One or more water-soluble alcohols added to the water in an amount sufficient to depress the freezing point thereof to allow the water to remain fluid in cold weather, one or more monohydric alcohols predominate the alcohol portion of these formulas.
3. A detergent or wetting agent
4. A water-soluble dye
5. Corrosion inhibitors Ingredients 4 and 5 are usually considered as being optional.

In accordance with the invention, fluids of the above type can be improved in their operational efficiency whereby, when sprayed in the form of fine streams onto windshields, the stream is made more cohesive, and when used to clean dirty windshields, the abrasive action on the windshield wipers is diminished by adding to such fluids between 10–1,000 ppm of an acrylamide polymer having a molecular weight of at least 10,000.

THE WATER-SOLUBLE ALCOHOL

The water-soluble alcohols commonly used in windshield washer fluids may be selected from any number of water-soluble lower aliphatic alcohols which are capable of depressing the freezing point of water. Exemplary of such materials are methanol, ethanol, propanol, isopropanol, ethylene glycol, propylene glycol and the like. As indicated, the water-soluble monohydric alcohols are used primarily. When polyhydric alcohols are used, they are employed only in minor amounts in relation to the monohydric alcohols.

Most commercial windshield washer fluids utilize blends of alcohols. The particular amount of alcohol or alcohol blends used in preparing these formulas varies. The particular amount used will depend upon the particular freezing point depression desired to be imparted to the water treated with these alcohols. The fluids usually have a freezing point between 10°–40° F.

THE WETTING AGENT OR DETERGENT

Most detergents or wetting agents used in windshield washer fluids are nonionic and are usually ethoxylated materials such as nonylphenol reacted with 5–25 moles of ethylene oxide. Other nonionic detergents that may be used in such formulas are listed in the work, McCutcheon's Detergents and Emulsifiers, 1974, Allured Publishing Corp., Ridgewood, New Jersey.

The amount of wetting agent or detergent used may vary from as little as 0.01% to as much as 5–15% by weight. Excessive amounts beyond these quantities are not used generally since excessive foam sometimes occurs.

MISCELLANEOUS COMPONENTS

As indicated, other components are oftentimes found in various formulas of windshield washer fluids which include water-soluble dyes which need not be enumerated herein since they are well known.

Also, corrosion inhibitors such as sodium metaborate, borax, sodium silicate, sodium nitrate, phosphates and the like are sometimes used to protect the metallic portions of the windshield washing mechanism used to pump the fluid.

THE ACRYLAMIDE POLYMERS

These polymers are well known to the art and have been described in numerous publications and patents. The polymers used in this invention are acrylamide polymers which include polyacrylamide and its water-soluble copolymeric derivatives such as, for instance, acrylamide-acrylic acid, and acrylamide-acrylic acid salt copolymers which contain from about 95–5% by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5% by weight of acrylamide.

The molecular weight of the acrylamide polymers may vary between 10,000 up to as high as 25,000,000. Preferably the molecular weight is in excess of 1,000,000.

A convenient method of adding acrylamide polymers to windshield washer fluids is to use concentrated water-in-oil emulsions of these polymers which are readily inverted into windshield washer fluids. Water-in-oil emulsions of this type as well as their method of inversion is set forth in U.S. Pat. No. 3,624,019, the disclosure of which is incorporated herein by reference.

An important concept of the invention resides in using an amount of acrylamide polymer within the parts per million range specified which does not substantially increase the viscosity of the fluid. Surprisingly, when small amounts of the polymers are used and the fluid is ejected from the normal pumps used in automobiles to apply the fluid, a more cohesive stream is formed which is less susceptible to being diverted from the windshield by wind. Thus, the polymers enable more fluid to be directed onto the windshield wiper area allowing better operation of the fluid and wipers to be achieved. Also, it has been found that the small amount of acrylamide polymer used in the practice of the invention is capable of placing a thin lubricating film on the windshield that is invisible which tends to lubricate windshield wiper blades, thereby prolonging their life.

EXAMPLE

To illustrate the invention the following is given by way of example.

The following windshield washer fluid formula would be used:

| Ingredient | % By Weight |
| --- | --- |
| Methanol | 25% |
| Isopropanol | 22% |
| Ethylene Glycol | 3% |
| Normal Phenol Reacted with 9 Moles of | .5% |
| Ethylene Oxide | |

The above formula was also prepared so that it contained 50 ppm of a polymer which was a copolymer of acrylamide with 10% by weight of acrylic acid (Na salt) and had a molecular weight of about 2,000,000. A small amount of the untreated formula added to 50% by weight Chicago tap water would be tested using a 1971, 4-door Chevrolet sedan equipped with a conventional windshield washer fluid reservoir, pump and associated tubing and nozzles and driven at 55 mph in a 25 mph cross wind. It would be observed that the windshield washer fluid when activated from the dashboard switch would tend to be sprayed away from the windshield area due to the high wind velocity generated due to windage and speed. When the polymer containing formula would be sprayed under the same conditions, at least 40% more of the fluid would reach and contact the windshield and windshield wiper area. Furthermore, when such a formula as described above would be used for at least 6 months to a year under normal driving conditions encountered in a large city, wiper blade life would be extended between 10–20%.

| PRIOR ART | |
| --- | --- |
| U.S. 3,102,548 | U.S. 3,524,367 |
| U.S. 3,286,674 | U.S. 3,532,014 |
| U.S. 3,360,356 | U.S. 3,705,693 |
| U.S. 3,413,109 | |

Having thus described my invention, it is claimed as follows:

1. A process for cleaning a windshield and for treating rubber windshield wiper blades comprising applying to said windshield a windshield washer fluid containing a major proportion of water, one or more water-soluble alcohols which are predominantly monohydric alcohols capable of depressing the freezing point of water, a surfactant, and from 10–1000 ppm of acrylamide polymer with molecular weight at least 10,000, said acrylamide polymer preventing excessive wear of said rubber windshield wiper blades and reducing windage losses of said windshield wiper fluid.

* * * * *